(12) United States Patent
Han et al.

(10) Patent No.: US 9,327,682 B2
(45) Date of Patent: May 3, 2016

(54) SAFETY BELT SYSTEM FOR VEHICLE SEATS

(71) Applicant: KYUNGPOOK NATIONAL UNIVERSITY INDUSTRY-ACADEMIC COOPERATION FOUNDATION, Daegu (KR)

(72) Inventors: Dong Seog Han, Daegu (KR); In Suk Hamm, Daegu (KR); Nam Cheol Kang, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 14/397,648

(22) PCT Filed: Apr. 30, 2013

(86) PCT No.: PCT/KR2013/003729
§ 371 (c)(1),
(2) Date: Oct. 29, 2014

(87) PCT Pub. No.: WO2013/165153
PCT Pub. Date: Nov. 7, 2013

(65) Prior Publication Data
US 2015/0353050 A1    Dec. 10, 2015

(30) Foreign Application Priority Data

May 2, 2012    (KR) .......................... 10-2012-0046348

(51) Int. Cl.
*B60R 22/48* (2006.01)
*B60N 2/42* (2006.01)
*B60R 22/02* (2006.01)

(52) U.S. Cl.
CPC . *B60R 22/48* (2013.01); *B60N 2/42* (2013.01); *B60R 22/023* (2013.01)

(58) Field of Classification Search
CPC   B60R 22/00; B60R 22/48; B60R 2202/4808; B60R 22/36; B60R 2021/0048; B60R 2021/2074; B60R 22/26; B60R 22/208; B60R 21/01516; B60R 21/0132; B60N 2/427; B60N 2/42709; B60N 2/48; B60N 2/4885
USPC .............. 297/216.1, 216.12, 216.13, 216.14, 297/216.15, 216.16, 216.17, 216.18, 297/216.19, 220, 391, 427, 474–479, 483
See application file for complete search history.

(56) References Cited

U.S. PATENT DOCUMENTS 4,744,601 A * 5/1988 Nakanishi ................ B60N 2/48
297/216.12
5,154,477 A * 10/1992 Lacy ...................... A47C 7/383
297/397

(Continued)

FOREIGN PATENT DOCUMENTS

JP    2010-125942 A    6/2010
KR   1998-0046943 U    9/1998

(Continued)

*Primary Examiner* — Beth Stephan
(74) *Attorney, Agent, or Firm* — Revolution IP, PLLC

(57) ABSTRACT

Disclosed is a safety belt system for vehicle seats, including: a vehicle seat part which includes a seat portion, and a backrest; a safety belt which includes a shoulder belt, and a waist belt, and restricts a body of an occupant; a headrest which is connected with the backrest by a rotation shaft, and protects a face or neck region of the occupant from the shoulder belt using a cushion having both convex sides; a sensor which senses impact of the vehicle; and a rotation locking unit which prevents the headrest from being rotated when the sensor senses an accident signal that is equal to or greater than a predetermined output.

8 Claims, 4 Drawing Sheets

(56) References Cited

U.S. PATENT DOCUMENTS

| | | | | |
|---|---|---|---|---|
| 5,211,696 A * | 5/1993 | Lacy | ............... | A47C 7/383 297/391 |
| 5,451,094 A * | 9/1995 | Templin | ............... | B60N 2/4221 296/68.1 |
| 6,033,018 A * | 3/2000 | Fohl | ............... | B60N 2/2222 297/216.12 |
| 6,109,691 A * | 8/2000 | Gray | ............... | B60N 2/4214 297/216.17 |
| RE37,123 E * | 4/2001 | Templin | ............... | B60N 2/4221 296/68.1 |
| 6,402,195 B1 * | 6/2002 | Eisenmann | ............... | B60N 2/002 280/735 |
| 6,746,078 B2 * | 6/2004 | Breed | ............... | B60N 2/002 297/216.1 |
| 7,588,289 B2 | 9/2009 | Bostrom et al. | | |
| 7,794,012 B2 * | 9/2010 | Szablewski | ............... | B60N 2/002 297/216.12 |
| 7,894,960 B2 * | 2/2011 | Farquhar | ............... | B60N 2/002 297/216.12 |
| 2002/0101092 A1 * | 8/2002 | Bowers | ............... | B60N 2/688 296/68.1 |
| 2002/0195846 A1 * | 12/2002 | Masuda | ............... | B60N 2/4885 297/216.12 |
| 2003/0227199 A1 * | 12/2003 | Yoshizawa | ............... | B60N 2/4228 297/216.12 |
| 2004/0012234 A1 * | 1/2004 | Yamaguchi | ............... | B60N 2/0276 297/216.12 |
| 2004/0245833 A1 * | 12/2004 | Svantesson | ............... | B60N 2/4885 297/408 |
| 2006/0119150 A1 * | 6/2006 | Hoffmann | ............... | B60N 2/4864 297/216.12 |
| 2006/0186713 A1 * | 8/2006 | Breed | ............... | B60N 2/0232 297/216.12 |
| 2006/0273636 A1 * | 12/2006 | Sugimoto | ............... | B60N 2/4214 297/216.12 |
| 2007/0096514 A1 * | 5/2007 | Haglund | ............... | B60N 2/42781 297/216.12 |
| 2007/0107969 A1 * | 5/2007 | Ootani | ............... | B60N 2/0232 180/282 |
| 2008/0164731 A1 * | 7/2008 | Bostrom | ............... | B60N 2/4885 297/216.12 |
| 2010/0237677 A1 * | 9/2010 | Nam | ............... | A47C 7/38 297/410 |
| 2010/0295349 A1 * | 11/2010 | Schaal | ............... | B60N 2/002 297/216.12 |
| 2013/0278027 A1 * | 10/2013 | Brucato | ............... | B60N 2/4805 297/216.12 |
| 2013/0300166 A1 * | 11/2013 | Munemura | ............... | B60N 2/4885 297/216.12 |

FOREIGN PATENT DOCUMENTS

| | | |
|---|---|---|
| KR | 10-2010-0013242 A | 2/2000 |
| KR | 10-0584907 B1 | 5/2006 |

* cited by examiner

Prior Art

SAFETY BELT SYSTEM FOR VEHICLE SEATS

CROSS REFERENCE TO PRIOR APPLICATIONS

This application is a National Stage Application of PCT International Patent Application No. PCT/KR2013/003729 filed on Apr. 30, 2013, under 35 U.S.C. §371, which claims priority to Korean Patent Application No. 10-2012-0046348 filed on May 2, 2012, which are all hereby incorporated by reference in their entirety.

TECHNICAL FIELD

The present invention relates to a safety belt system for vehicle seats, and more particularly, to a safety belt system for vehicle seats, which may prevent an injury to a face or neck region due to a shoulder belt when a body leans toward a side due to a traffic accident.

BACKGROUND ART

In general, the greatest reason why a traffic accident such as a collision accident or a rollover accident of a vehicle causes injuries to occupants is that the occupant is catapulted out of the vehicle due to inertia caused by a traveling speed of the vehicle and then falls onto a road surface while experiencing impact, or a driver collides with a front glass, an instrument panel, or the like and then suffers a head injury or a neck injury, or a chest of the driver collides with a steering wheel such that the driver suffers a chest injury.

Thus, although a motor vehicle safety belt does not directly or fundamentally prevent a traffic accident, the motor vehicle safety belt is used as an effective means that fixes the occupant to the seat at the time of a traffic accident, and prevents the occupant from being catapulted out of the vehicle or colliding with apparatuses in the vehicle, thereby reducing a fatality rate and severity of an injury at the time of a traffic accident while the vehicle is travelling, and as a result, traffic regulations make it mandatory for the occupant to fasten the safety belt.

In this case, the motor vehicle safety belt should not cause any inconvenience when the driver drives the vehicle, and needs to assuredly protect the occupant at the time of an emergency.

As illustrated in FIG. 1, the motor vehicle safety belt typically includes a belt 10 which restricts a body of an occupant, a slip guide 19 which guides the belt 10, a retractor 12 which winds up the belt 10 passing through the slip guide 19, a tongue plate 14 which is fastened to the belt 10, a buckle 16 which fixes the belt 10 and binds with the tongue plate 14 fixed to the belt 10, and an anchor 18 which is a supporting shaft of the belt 10, and in this case, the belt 10 includes a shoulder belt 10a, and a waist belt 10b for the occupant.

It is obvious that the motor vehicle safety belt in the related art as described above exhibits a significant effect in respect that the motor vehicle safety belt reduces injuries to the occupants at the time of a vehicle accident.

That is, severity of an injury to the occupant is relatively reduced when the occupant fastens the safety belt in comparison with when the occupant does not fasten the safety belt, but even though the occupant fastens the safety belt, the occupant may suffer injuries to the neck, the abdomen, the chest, the waist, and the like.

In particular, regarding the structure of the safety belt, the belt has the shoulder belt 10a, and the waist belt 10b, such that the shoulder belt 10a supports an upper body of the occupant and the waist belt 10b supports a pelvis of the occupant at the time of a collision accident, but there is a problem in that in a case in which the body of the occupant leans toward a side due to a traffic accident, the safety belt strikes the neck or the face other than protecting, which directly and seriously affects the life of the occupant as compared to other body parts.

That is, injuries to drivers due to vehicle collisions are caused by various reasons such as direct impact to the drivers or a crushing accident of the vehicle, and the safety belt is a powerful protective device for minimizing injuries due to vehicle impact and protecting the driver, but the driver may often and unexpectedly sustain an additional external injury caused by the safety belt itself because of an arrangement configuration of the safety belt in the related art, and therefore, there are various attempts in terms of the arrangement, the shape, and the configuration of the safety belt, but there are drawbacks in that an arrangement configuration is complicated, additional devices are required, and as a result, manufacturing costs are increased.

DISCLOSURE

Technical Problem

The present invention has been made in an effort to solve the aforementioned problem, and an object of the present invention is to provide a safety belt system for vehicle seats, which provides a shape of a headrest, which may protect a face or neck region from a vehicle safety belt at the time of a vehicle accident and assist a driver or an occupant in assuring driving performance and visibility, senses impact when a vehicle collision or accident occurs, and automatically prevents the headrest from being rotated, thereby improving safety.

Technical Solution

In order to achieve the aforementioned object, the present invention provides a safety belt system for vehicle seats, including: a vehicle seat part which includes a seat portion, and a backrest; a safety belt which includes a shoulder belt, and a waist belt, and restricts a body of an occupant; a headrest which is connected with the backrest by a rotation shaft, and protects a face or neck region of the occupant from the shoulder belt using a cushion having both convex sides; a sensor which senses impact of the vehicle; and a rotation locking unit which prevents the headrest from being rotated when the sensor senses an accident signal that is equal to or greater than predetermined output.

Here, the safety belt may include a slip guide which guides the belt, a retractor which winds up the belt passing through the slip guide, a tongue plate which is fastened to the belt, a buckle which is installed at one side of a seat in which the occupant is seated, fixes the belt, and binds with the tongue plate, and an anchor which fixes the other end of the belt to a vehicle body.

In addition, the sensor may be a strain gage, or an acceleration sensor, and the sensor may be installed on the rotation shaft or the headrest, and may sense the impact.

Furthermore, when the accident signal is sensed, the rotation locking unit may prevent the rotation of the headrest only for a predetermined time, and the safety belt system may further include a switch button which is electrically connected with the rotation locking unit, and by which the rotation of the headrest is locked or released in accordance with selection of the occupant.

Advantageous Effects

The present invention provides the safety belt system for vehicle seats which provides a shape of the headrest which may protect the face or neck region from the motor vehicle safety belt, and assist a driver or an occupant in assuring driving performance and visibility, and provides a system in which the headrest of the vehicle seat is rotated about the rotation shaft that is connected with the backrest, and the rotation of the headrest is automatically prevented by sensing impact when a vehicle collision or accident occurs, thereby improving safety and convenience.

In addition, there are advantages in that a configuration is simple, and design or arrangement is facilitated, thereby reducing additional costs required to improve safety and convenience.

BEST MODE

Figure 1:
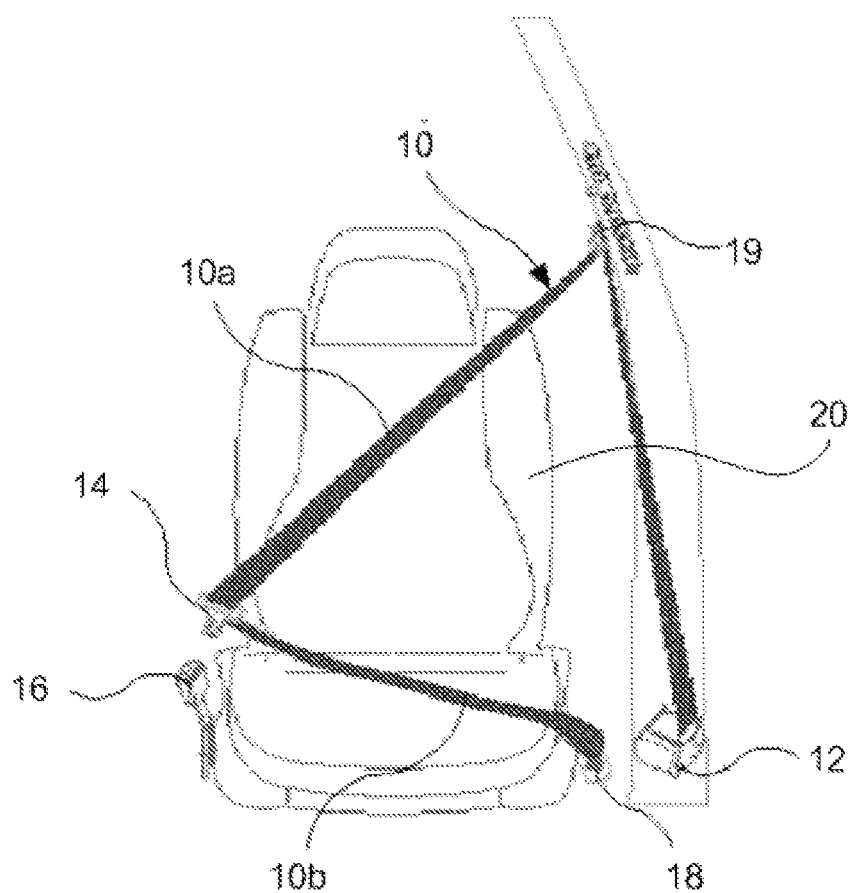
FIG. 1 is a view illustrating a configuration of a safety belt system in the related art.
Figure 2:
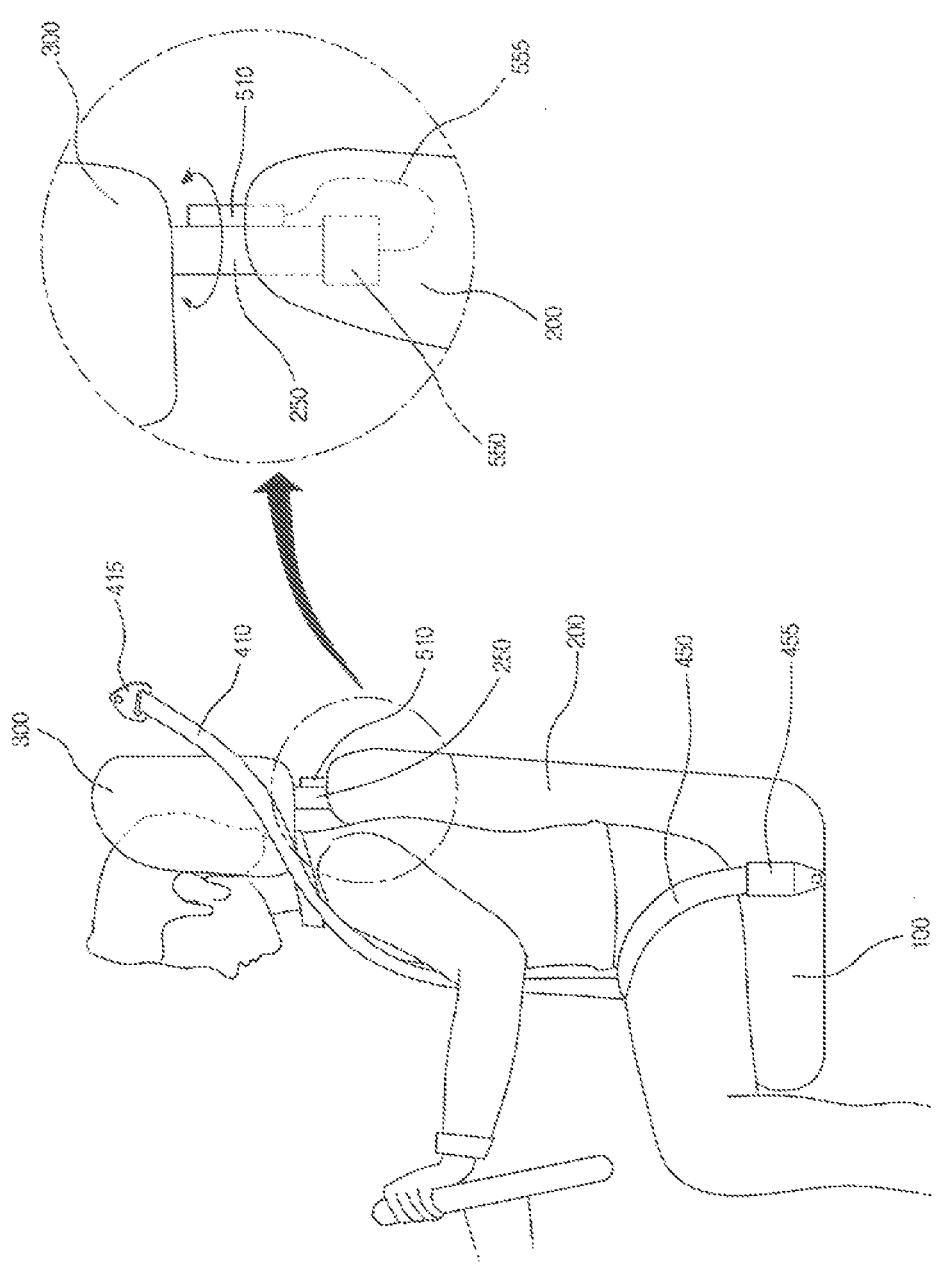
FIG. 2 is a view illustrating a side use state of a safety belt system for vehicle seats according to an exemplary embodiment of the present invention.

FIG. 2 is a view illustrating a side use state of a safety belt system for vehicle seats according to an exemplary embodiment of the present invention.

As illustrated in FIG. 2, the safety belt system for vehicle seats according to the exemplary embodiment of the present invention includes: a vehicle seat part which includes a seat portion 100, and a backrest 200; a safety belt which includes a shoulder belt 410, and a waist belt 450, and restricts a body of an occupant; a headrest 300 which is connected with the backrest 200 by a rotation shaft 250, and protects a face or neck region from the shoulder belt 410 using a cushion having both convex sides; a sensor 510 which senses impact of the vehicle; and a rotation locking unit 550 which prevents the headrest 300 from being rotated when the sensor 510 senses an accident signal that is equal to or greater than a predetermined output.

In the exemplary embodiment of the present invention, there is presented a shape of the headrest 300 which may protect the face or neck region from the belt, and assist a driver or an occupant in assuring driving performance and visibility, and there is presented a system in which the headrest 300 of the vehicle seat is rotated about the rotation shaft 250 that is connected with the backrest 200, and the rotation of the headrest 300 is automatically prevented by sensing impact when a vehicle collision or accident occurs.

Mode for Invention

Advantages and features of the present invention and methods of achieving the advantages and features will be described with reference to exemplary embodiments described in detail below together with the accompanying drawings. However, the present invention is not limited to the exemplary embodiments described herein, and may be implemented in various different forms. The present exemplary embodiments are merely provided to describe the technical spirit of the present invention in detail so that the technical spirit of the present invention may be easily implemented by those with ordinary skill in the art to which the present invention pertains.

In the drawings, the exemplary embodiments of the present invention are not limited to the illustrated specific forms, but exaggerated for the purpose of clarity. In addition, like reference numerals designate like elements throughout the specification.

In the present specification, the term "and/or" is understood to include at least one of the constituent elements that are enumerated in the context. In addition, a singular form also includes a plural form unless particularly stated otherwise in the present specification. In addition, the word "comprises" and/or "comprising" used in the present specification will be understood to imply the inclusion of stated constituents, steps, operations, and elements but not the exclusion of one or more other constituents, steps, operations, elements, and devices.

Hereinafter, the exemplary embodiment according to the present invention will be described in detail with reference to the drawings.

FIG. 2 is a view illustrating a side use state of the safety belt system for vehicle seats according to the exemplary embodiment of the present invention.

As illustrated in FIG. 2, the safety belt system for vehicle seats according to the exemplary embodiment of the present invention includes: a vehicle seat part which includes a seat portion 100, and a backrest 200; a safety belt which includes a shoulder belt 410, and a waist belt 450, and restricts a body of an occupant; a headrest 300 which is connected with the backrest 200 by a rotation shaft 250, and protects a face or neck region of the occupant from the shoulder belt 410 using a cushion having both convex sides; a sensor 510 which senses impact of the vehicle; and a rotation locking unit 550 which prevents the headrest 300 from being rotated when the sensor 510 senses an accident signal that is equal to or greater than a predetermined output.

Here, a configuration of the safety belt includes a slip guide 415 which guides the belt, a retractor 455 which winds up the belt passing through the slip guide 415, a tongue plate which is fastened to the belt, a buckle which is installed at one side of a seat in which the occupant is seated, fixes the belt, and binds with the tongue plate, and an anchor 430 which fixes the other end of the belt to a vehicle body. This configuration is the same as the configuration of the motor vehicle safety belt in the related art.

However, the safety belt in the related art has a problem in that when the body of the occupant leans toward the shoulder belt 410 due to a vehicle collision, the shoulder belt 410 rapidly exerts pressure on a face or neck region of the occupant, such that the occupant may sustain a serious injury, or may be severely wounded as the shoulder belt 410 squeezes the neck region.

Accordingly, the present invention provides a shape of the headrest 300 which may protect the face or neck region from the belt, and assist a driver or an occupant in assuring driving performance and visibility, and a system in which the headrest 300 of the vehicle seat is rotated about the rotation shaft 250 that is connected with the backrest 200, and the rotation of the headrest 300 is automatically prevented by sensing or impact when a vehicle collision or accident occurs.

In the configuration according to the exemplary embodiment of the present invention, the shape of the headrest 300 is different from a shape of the headrest 300 of the general vehicle seat in the related art, and in the exemplary embodiment of the present invention, the headrest 300 is formed as a cushion having both convex sides.

The shape of the headrest 300 has a great advantage in that when an accident such as vehicle collision occurs, the headrest 300 may not only protect the face or neck region of the driver or the occupant from lateral impact, but also basically prevent injuries due to the shoulder belt 410.

Further, the shape of the headrest 300 may stably hold the head of the occupant, and may protect sides of the face using the cushion having both convex sides, but the headrest 300 may of course have various shapes that are different from the shape in the exemplary embodiment illustrated in FIG. 2. Only a lower end portion at a lateral side of the headrest 300 may be formed as the cushion having the convex shape in consideration of a contact point with the shoulder belt 410. In a case in which only lower end portions at both lateral sides of the headrest 300 are formed in a convex shape, there is an advantage in that a viewing angle between both sides of the driver or the occupant may be widened.

Furthermore, as illustrated in FIG. 2, the safety belt system for vehicle seats according to the exemplary embodiment of the present invention provides a structure in which the headrest 300 and the backrest 200 are connected with each other by the rotation shaft 250, and the headrest 300 may be rotated leftward and rightward about the rotation shaft 250, that is, a structure in which the headrest 300 may be rotated as the driver naturally turns the head so as to solve problems in that the viewing angle between both sides of the driver or the occupant is narrow due to the cushion of the headrest 300 which has both convex sides and the driver or the occupant inconveniently turns the head.

In addition, an injury caused by a collision and an injury caused by the shoulder belt 410 cannot be prevented when an accident occurs in a state in which the driver turns the head toward a side, and therefore, in the exemplary embodiment of the present invention, the sensor 510, which senses impact, is installed on the rotation shaft 250 or the headrest 300, and the rotation locking unit 550 is installed at a lower end portion of the rotation shaft 250 inserted into the backrest 200, such that the sensor 510 senses impact at the time of a vehicle collision or an accident, and the rotation of the headrest 300 is immediately prevented by the rotation locking unit 550 based on the sensed signal, thereby protecting the face or neck region of the driver or the occupant.

Figure 3A:
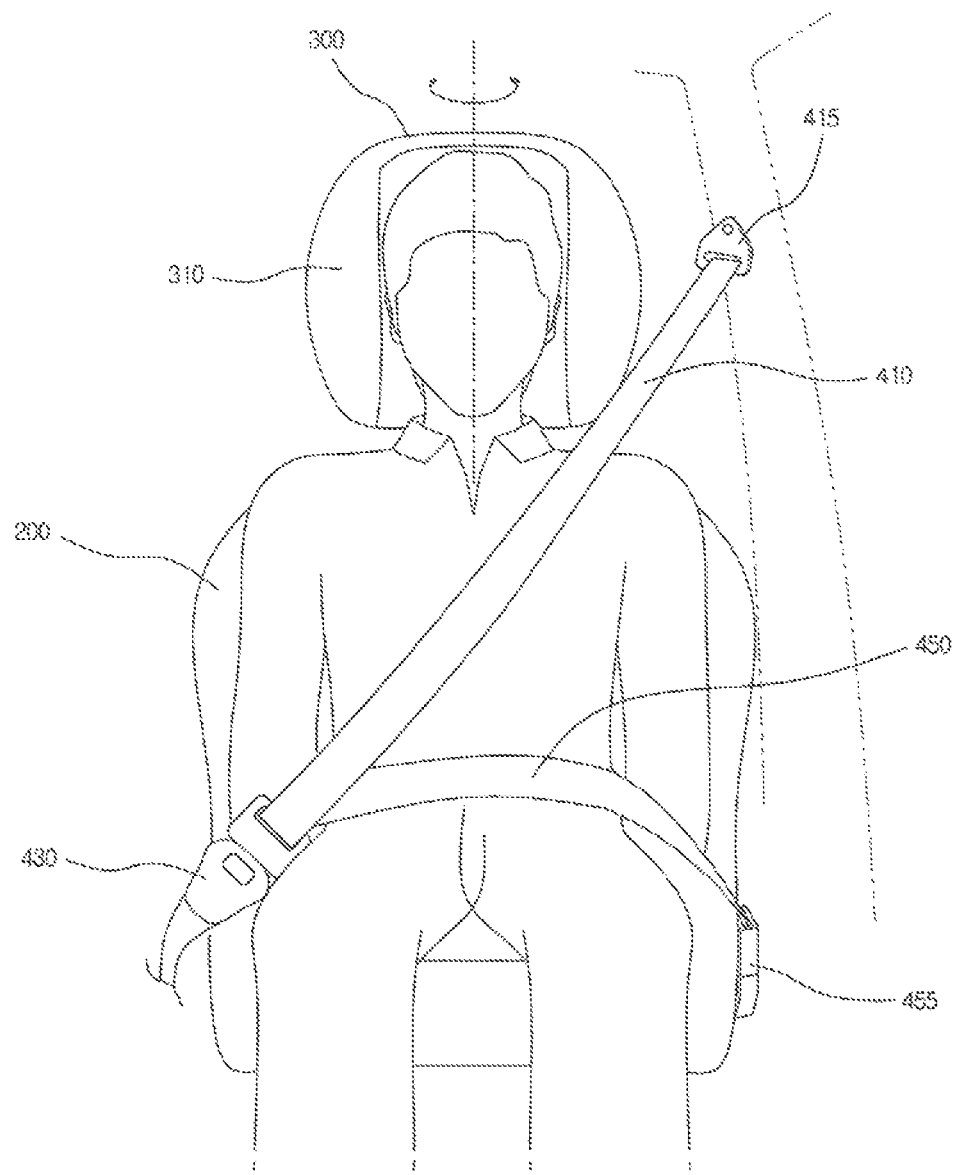
FIG. 3A is a view illustrating a use state of the safety belt system for vehicle seats according to the exemplary embodiment of the present invention.

FIG. 3A is a view illustrating a use state of the safety belt system for vehicle seats according to the exemplary embodiment of the present invention. As illustrated in FIG. 3A, according to the safety belt, the anchor 430, which is installed at a lower end at a side of the occupant, and the slip guide 415, which is installed at an upper side of a side of the occupant, are connected by the belt, the belt is wound by the retractor 455 by pulling the belt while passing through the slip guide 415, and the tongue plate fastened to the belt binds with the buckle that is installed at one side of the seat in which the occupant is seated, such that the safety belt is fastened.

When the occupant fastens the safety belt, the shoulder belt 410, which runs over one shoulder of the occupant, and the shoulder belt 410, which runs over the waist of the occupant, form a .angle. shape, and the belt is tensely fixed at the time of a vehicle collision or an accident so as to serve to prevent the occupant from deviating from the vehicle seat, but a face or neck region of the occupant may be occasionally injured due to the shoulder belt 410. Accordingly, the exemplary embodiment of the present invention presents the headrest 300 of the vehicle seat which is shaped like the cushion having both convex sides 310, thereby basically preventing the face or neck region of the occupant from being injured due to the belt.

In addition, in order to allow the occupant to assure visibility at both sides and to conveniently turn the head, there is presented a structure in which the headrest 300 and the backrest 200 of the vehicle seat are connected with each other by the rotation shaft 250 so that the headrest 300 may be naturally rotated.

Figure 3B:
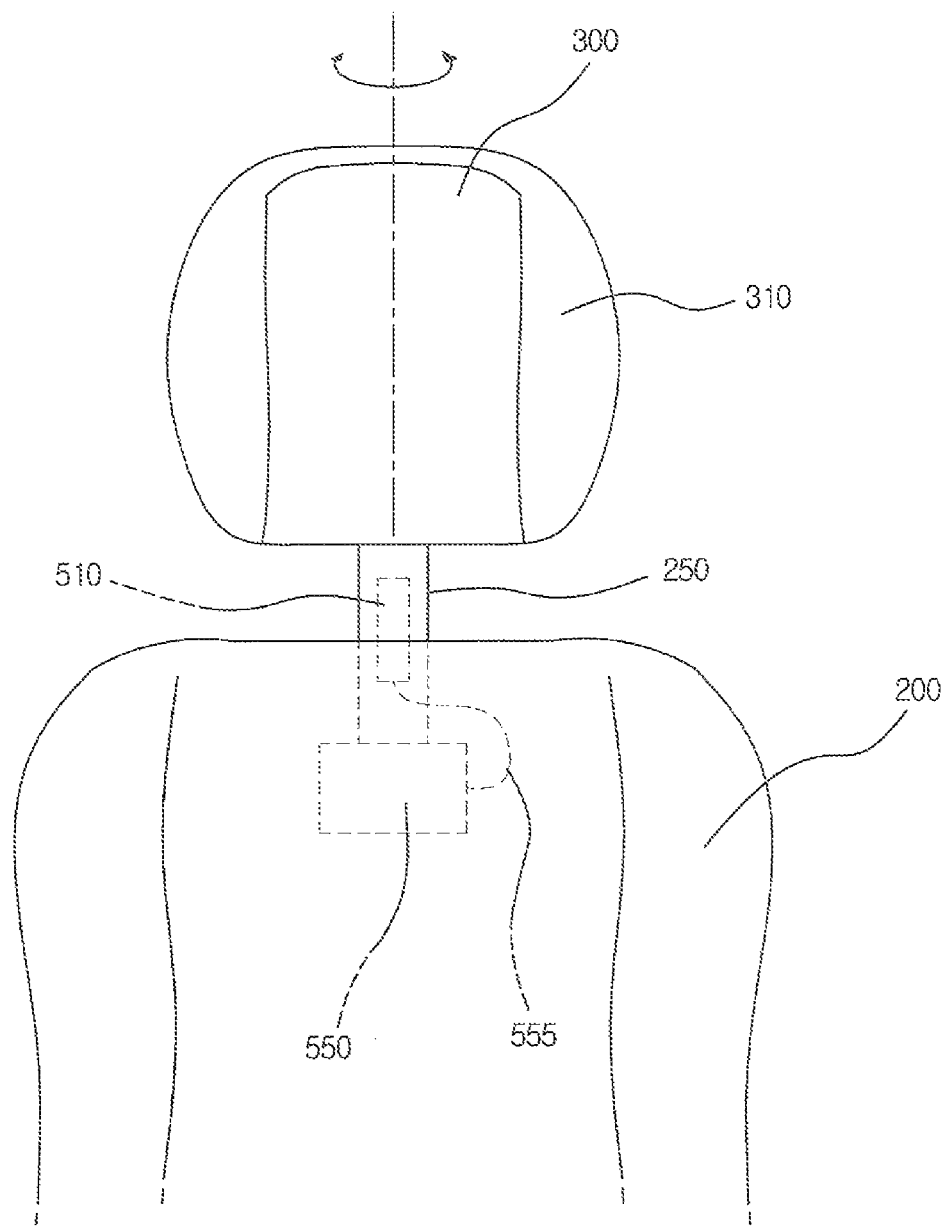
FIG. 3B is a view illustrating a configuration of a rotation locking system of the safety belt system for vehicle seats according to the exemplary embodiment of the present invention.

FIG. 3B is a view illustrating a configuration of the rotation locking system of the safety belt system for vehicle seats according to the exemplary embodiment of the present invention. As illustrated in FIG. 3B, the headrest 300 and the backrest 200 of the vehicle seat are connected with each other by the rotation shaft 250, the sensor 510, which may sense impact, is be installed on one surface of the rotation shaft 250, and the rotation locking unit 550, which may prevent the headrest 300 from being rotated, is installed at the lower end portion of the rotation shaft 250.

Here, the sensor 510, which may sense impact, may be installed as a strain gage having piezoelectric characteristics or an acceleration sensor. The strain gage refers to a measuring device which is attached to an object and measures deformation of the object when the object is deformed by external force, and the strain gage measures an increased amount of electric resistance when the electric resistance is increased as an alloy wire is deformed in a tensile direction, a length of the alloy wire is increased, and a cross-sectional area of the alloy wire is decreased.

Thus, when the strain gage is fixedly installed at any one portion of the rotation shaft 250 or the headrest 300, the alloy wire of the strain gage is deformed when external impact occurs, electric resistance is increased in accordance with the length of the deformed alloy wire, and an electric signal is produced, thereby sensing impact or a collision of the vehicle.

In addition, the acceleration sensor is the sensor 510 which measures acceleration of a moving object or intensity of the impact, and measures dynamic force such as acceleration, vibration, or impact of the object by processing an output signal. Since the acceleration sensor may precisely sense a motion state of the object, the acceleration sensor is utilized in a wide field, and used for various purposes. The acceleration sensor is an essential sensor 510 used for a control system in various types of transportation means such as vehicles, trains, ships, and airplanes, factory automation systems, and robots.

Various types of acceleration sensors are present. In accordance with a detection method, the acceleration sensor is widely classified into an inertia type acceleration sensor, a gyro type acceleration sensor, and a silicon semiconductor type acceleration sensor, and a vibrometer, an inclinometer, or the like can be considered as a type of acceleration sensor. In the exemplary embodiment of the present invention, any acceleration sensor may be applied as long as the sensor 510 may sense the least amount of impact or collision of the vehicle which may cause the occupant to be injured.

Further, when the strain gage or the acceleration sensor senses impact or a collision of the vehicle and an electric signal is produced, the signal is transmitted through a wire 555 to the rotation locking unit installed at the lower end portion of the rotation shaft 250, and the rotation locking unit 550 immediately prevents the headrest 300 from being rotated. The method of preventing the headrest from being rotated may use an electric prevention method using a solenoid, or may use a mechanical fastening structure. In addition, any device may of course be applied as long as the device may prevent the rotation using electric switching.

Here, regarding the signal of impact or a collision of the vehicle which is sensed by the strain gage or the acceleration sensor, only a signal, which is equal to or greater than a predetermined output, is set as an accident signal, and only when the rotation locking unit 550 receives the accident signal, the rotation may be prevented. Otherwise, the rotation of the headrest 300 is prevented even in the event of slight impact, which may cause inconvenience for the driver.

In addition, when the accident signal is sensed by the sensor 510, the rotation locking unit 550 may prevent the rotation of the headrest 300 only for a predetermined time. This is to reduce inconvenience when the driver manually needs to permit the rotation again after the rotation is prevented after a collision.

As described above, the rotation of the headrest is prevented at the time of impact or a collision of the vehicle, thereby automatically or basically preventing the face or neck region of the occupant from being severely injured as the occupant unconsciously turns the head at the time of a collision. In addition, at the time of a collision, the occupant leans forward, and then returns back to the headrest 300 by a reaction force by an airbag, and at this time, it is possible to avoid a dangerous situation caused by the rotation of the headrest 3.

Further, the rotation of the headrest 300 may be prevented when a collision or impact of the vehicle is sensed, and a switch button, which is electrically connected with the rotation locking unit 550, may be installed at a position (inside a door or on a steering wheel) adjacent to the driver, such that the occupant may selectively prevent or permit the rotation of the headrest 300 as necessary.

As described above, the present invention has been illustrated and described with reference to the specific exemplary embodiment, but it will be easily understood by those with ordinary skill in the technical field to which the present invention pertains that various alterations and modifications may be made without departing from the technical spirit and the scope of the present invention disclosed in claims.

INDUSTRIAL APPLICABILITY

The present invention relates to a safety belt system for vehicle seats, which provides a shape of a headrest, which may protect a face or neck region from a vehicle safety belt at the time of a vehicle accident and assist a driver or an occupant in assuring driving performance and visibility, senses impact when a vehicle collision or accident occurs, and automatically prevents the headrest from being rotated, thereby improving safety, and therefore, the present invention is industrially applicable.

The invention claimed is:

1. A safety belt system for vehicle seats, comprising:
a vehicle seat part which includes a seat portion, and a backrest;
a safety belt which includes a shoulder belt, and a waist belt, and restricts a body of an occupant;
a headrest which is connected with the backrest by a rotation shaft, and protects a face or neck region of the occupant from the shoulder belt using a cushion,
wherein the headrest forms with the cushion that both sides of the headrest forms a convex shape relative to the center of the headrest;
a sensor which senses impact of the vehicle;
a rotation locking unit which prevents the headrest from being rotated when the sensor senses an accident signal that is equal to or greater than a predetermined output; and
a switch button which is electrically connected with the rotation locking unit, and by which the rotation of the headrest is locked or released in accordance with selection of the occupant.

2. The safety belt system of claim 1, wherein the safety belt includes a slip guide which guides the belt, a retractor which winds up the belt passing through the slip guide, a tongue plate which is fastened to the belt, a buckle which is installed at one side of a seat in which the occupant is seated, fixes the belt, and binds with the tongue plate, and an anchor which fixes the other end of the belt to a vehicle body.

3. The safety belt system of claim 1, wherein the sensor is a strain gage, or an acceleration sensor.

4. The safety belt system of claim 3, wherein the sensor is installed on the rotation shaft or the headrest, and senses the impact.

5. The safety belt system of claim 1, wherein when the accident signal is sensed, the rotation locking unit prevents the rotation of the headrest only for a predetermined time.

6. The safety belt system of claim 2, wherein when the accident signal is sensed, the rotation locking unit prevents the rotation of the headrest only for a predetermined time.

7. The safety belt system of claim 3, wherein when the accident signal is sensed, the rotation locking unit prevents the rotation of the headrest only for a predetermined time.

8. The safety belt system of claim 4, wherein when the accident signal is sensed, the rotation locking unit prevents the rotation of the headrest only for a predetermined time.

* * * * *